United States Patent
Yoakum et al.

(10) Patent No.: US 8,868,657 B2
(45) Date of Patent: Oct. 21, 2014

(54) METHOD AND SYSTEM FOR GENERATING A COLLABORATION TIMELINE ILLUSTRATING APPLICATION ARTIFACTS IN CONTEXT

(75) Inventors: John H. Yoakum, Cary, NC (US); James R. Gutcher, Sammamish, WA (US)

(73) Assignee: Avaya Inc., Basking Ridge, NJ (US)

( * ) Notice: Subject to any disclaimer, the term of this patent is extended or adjusted under 35 U.S.C. 154(b) by 604 days.

(21) Appl. No.: 12/971,380

(22) Filed: Dec. 17, 2010

(65) Prior Publication Data

US 2012/0158849 A1  Jun. 21, 2012

(51) Int. Cl.
*G06F 15/16* (2006.01)
*H04L 12/18* (2006.01)
*G06Q 10/10* (2012.01)

(52) U.S. Cl.
CPC .......... *H04L 12/1822* (2013.01); *G06Q 10/101* (2013.01); *G06Q 10/109* (2013.01)
USPC .......................................... 709/205; 709/223

(58) Field of Classification Search
USPC .................................................. 709/205, 223
See application file for complete search history.

(56) References Cited

U.S. PATENT DOCUMENTS

| | | | | |
|---|---|---|---|---|
| 5,717,869 | A * | 2/1998 | Moran et al. | 715/716 |
| 6,924,803 | B1 * | 8/2005 | Girling et al. | 345/473 |
| 7,143,357 | B1 * | 11/2006 | Snibbe et al. | 715/751 |
| 7,234,117 | B2 * | 6/2007 | Zaner et al. | 715/758 |
| 7,598,975 | B2 | 10/2009 | Cutler | |
| 7,954,049 | B2 * | 5/2011 | Fletcher et al. | 715/231 |
| 2006/0026251 | A1 * | 2/2006 | Cheng et al. | 709/207 |
| 2006/0080432 | A1 * | 4/2006 | Spataro et al. | 709/224 |
| 2006/0085245 | A1 * | 4/2006 | Takatsuka et al. | 705/9 |
| 2006/0092178 | A1 * | 5/2006 | Tanguay et al. | 345/629 |
| 2007/0266304 | A1 * | 11/2007 | Fletcher et al. | 715/500.1 |
| 2008/0005235 | A1 * | 1/2008 | Hegde et al. | 709/204 |
| 2008/0244418 | A1 * | 10/2008 | Manolescu et al. | 715/753 |
| 2010/0192072 | A1 * | 7/2010 | Spataro et al. | 715/753 |
| 2010/0228693 | A1 * | 9/2010 | Dawson et al. | 706/12 |
| 2010/0241972 | A1 * | 9/2010 | Spataro et al. | 715/753 |
| 2010/0322593 | A1 * | 12/2010 | Buxton | 386/241 |
| 2011/0131299 | A1 * | 6/2011 | Sardary | 709/219 |
| 2012/0078899 | A1 * | 3/2012 | Fontana et al. | 707/736 |
| 2012/0079380 | A1 * | 3/2012 | Tsai et al. | 715/716 |
| 2012/0209899 | A1 * | 8/2012 | Daenen | 707/827 |

FOREIGN PATENT DOCUMENTS

WO   2011056310 A1   5/2011

OTHER PUBLICATIONS

United Kingdom Examination and Search Report for patent application 1121774.2 mailed Apr. 13, 2012, 9 pages.
Examination Report for British patent application GB1121774.2 mailed Jun. 27, 2013, 7 pages.

(Continued)

*Primary Examiner* — Waseem Ashraf
(74) *Attorney, Agent, or Firm* — Withrow & Terranova, PLLC

(57) ABSTRACT

A method and apparatus for generating a collaboration timeline which illustrates application artifacts in context. A collaboration session includes a plurality of participants. Each participant collaborates via a corresponding processing device. Media streams associated with the plurality of participants are received during the collaboration session and a collaboration media stream based on the media streams is generated. A collaboration application generates an artifact during the collaboration session. A timeline entry is generated in a collaboration timeline, the timeline entry including time information identifying a time associated with the artifact, and a reference to the artifact.

28 Claims, 6 Drawing Sheets

(56) References Cited

OTHER PUBLICATIONS

Office Action for Danish Patent Application No. 102011118780.8, mailed Jan. 27, 2014, 4 pages.

First Office Action for Chinese Patent Application No. 201110436564.6, issued Apr. 2, 2014, 13 pages.

Examination Report for British Patent Application No. 1121774.2, issued Apr. 17, 2014, 3 pages.

* cited by examiner

METHOD AND SYSTEM FOR GENERATING A COLLABORATION TIMELINE ILLUSTRATING APPLICATION ARTIFACTS IN CONTEXT

FIELD OF THE DISCLOSURE

Embodiments disclosed herein relate generally to collaboration environments, and in particular to generating a collaboration timeline that identifies artifacts generated during a collaboration session.

BACKGROUND

Increasingly sophisticated application programs are being developed that can greatly enhance the productivity of a collaboration session. Such application programs typically execute on a processing device, such as a computer or smartphone, that is involved in the collaboration session, and enable program application functionality that is useful for a topic of the call.

As an example, a group of executives may participate in a conference call to discuss potential future financial numbers for a business. Each of the participants may have a processing device, such as a computer, that is also used by the respective participant in the collaboration session. A spreadsheet collaboration application may be executed which is capable of receiving input from at least two of the participants and updating a spreadsheet in response thereto. One or more of the participants manipulates the spreadsheet, which may be concurrently viewed by all of the participants, by entering or modifying numbers in various "what if" scenarios to see potential revenue outcomes. The output, such as a display of data, from such collaboration applications may be referred to as an artifact. Because each of the participants views the artifacts of the spreadsheet collaboration application in real time as if all of the participants were in the same geographical location, these types of collaboration applications can result in significant productivity and be the basis of important decisions.

One potential problem that arises during such collaboration sessions, however, is that the underlying basis of a decision made during the collaboration session may not be readily determinable at a later date. In other words, referring again to the example above, three months after the collaboration session, an executive may recall that he agreed to a certain course of action during the collaboration session, but the exact reasons that led him to agree may have been forgotten. While audio recording devices exist that enable a collaboration session to be recorded in an audio file, the audio file is simply an audio track of the entire call. Trying to find the relevant three or four minutes of dialog associated with a particular portion of the collaboration session can be time-consuming and frustrating. Moreover, the artifacts generated by a collaboration application during a collaboration session and viewed by the participants are not captured in an audio recording. For example, if during the above example a participant entered a particularly compelling scenario into the spreadsheet application which, after being displayed on the participants' display devices, persuaded the participants to follow a particular course of action, that particular artifact, i.e., the particular display output that convinced the participants to follow the particular course of action, may be quite important, but will not exist in an audio recording of the collaboration session.

Accordingly, there is a need for a collaboration timeline that identifies artifacts generated by collaboration applications during a collaboration session and facilitates subsequent identification of such artifacts and the pertinent discussions surrounding the generation of the artifacts.

SUMMARY

Embodiments disclosed herein relate to the generation of a collaboration timeline that identifies artifacts generated by a collaboration application during a collaboration session. In one embodiment, a plurality of participants participates in a collaboration session, such as a conference call. Each of the participants has at least one associated processing device. The processing device can generate and continuously transmit a media stream generated by the respective participant to a source, such as a media server, and can receive a media stream that includes the media streams of the other participants.

During the collaboration session, the media server forms a collaboration media stream based on the participants' media streams. The collaboration media stream includes a media stream time index. The media server determines that a collaboration application has been initiated during the collaboration session. The collaboration application is capable of receiving input from a plurality of the participants, and is capable of generating, or otherwise rendering, an artifact in response to participant input. The media server determines that the collaboration application has generated an artifact during the collaboration session, and captures the artifact. A timeline entry including time information identifying a time associated with the artifact and a reference to the artifact is generated in a collaboration timeline.

The timeline entry may include descriptive indicia identifying the artifact, such as by collaboration application name, and an ordinal identifying the particular artifact of a number of artifacts generated by the respective collaboration application during the collaboration session. The media server may generate a number of timeline entries, each of which corresponds to a different artifact generated during the collaboration session by one or more collaboration applications.

In one embodiment, the media server determines that the collaboration application has generated the artifact via an application programming interface (API) that is called by the collaboration application when the collaboration application generates the artifact. The collaboration application also provides the media server with the artifact, or with a reference to the artifact. The artifact may be stored in the collaboration timeline in association with the timeline entry, or may be stored in a storage that is separate from the collaboration timeline, and a link to the artifact may be stored in the collaboration timeline that identifies the location of the artifact.

In one embodiment where the media stream contains audio, the media server generates a phonetic index of the collaboration media stream in conjunction with the collaboration media stream. The phonetic index contains phonemes of words spoken during time segments of the collaboration session. The phonetic index enables subsequent searching of the collaboration media stream based on words that may have been spoken during the collaboration session.

A collaboration timeline player may be used to subsequently obtain information from a collaboration timeline. The timeline player accesses the collaboration timeline and the collaboration media stream that corresponds to the collaboration timeline. The timeline player receives a user selection of a particular timeline entry of a plurality of timeline entries contained in the collaboration timeline. The timeline player obtains the artifact associated with the particular timeline entry, and renders the artifact on a playback device. The timeline player also determines a begin location within the collaboration media stream based on the particular timeline entry. The timeline player begins rendering the media from the collaboration timeline at the begin location concurrently with the rendering of the particular artifact. A user of the timeline player is thus able to perceive the artifact while concurrently perceiving the context of the collaboration relating to the generation of the artifact.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to a collaboration session in which a number of participants collaborate with one another, such as a conference call. A collaboration session refers to a real-time information exchange between participants, wherein the real-time information is exchanged without the need for separate and repeated message initiation triggering by a user, such as is needed for email exchanges, IM exchanges, and the like. Examples of such real-time information exchanges include a voice call, such as a telephone conference, because each piece of information is exchanged automatically as it is spoken by a participant and does not require a separate message initiation trigger, such as sending an email. Another example is a video conference, either with or without audio, since the video information itself may comprise a real-time information exchange between participants in a video call.

The participants engage in an information exchange during the collaboration session, and also have associated processing devices that are communicatively coupled to one another via a network. A collaboration application refers to an application that can receive input from a plurality of the participants in the collaboration session, and based on such input, render an artifact to at least one of such participants. Preferably, the collaboration application can receive input from all the participants in the collaboration session and renders an artifact to all participants. An artifact refers to an output of the collaboration application that is generated during the collaboration session in response to input by one or more participants. The output could be visual, such as an image displayed on a display; audible, such as audio information played on an audio device such as a headset; or both. Thus, the artifact could comprise an image rendered on an output device, a segment of audio, or any other output perceivable by a participant in the collaboration session.

Figure 1:
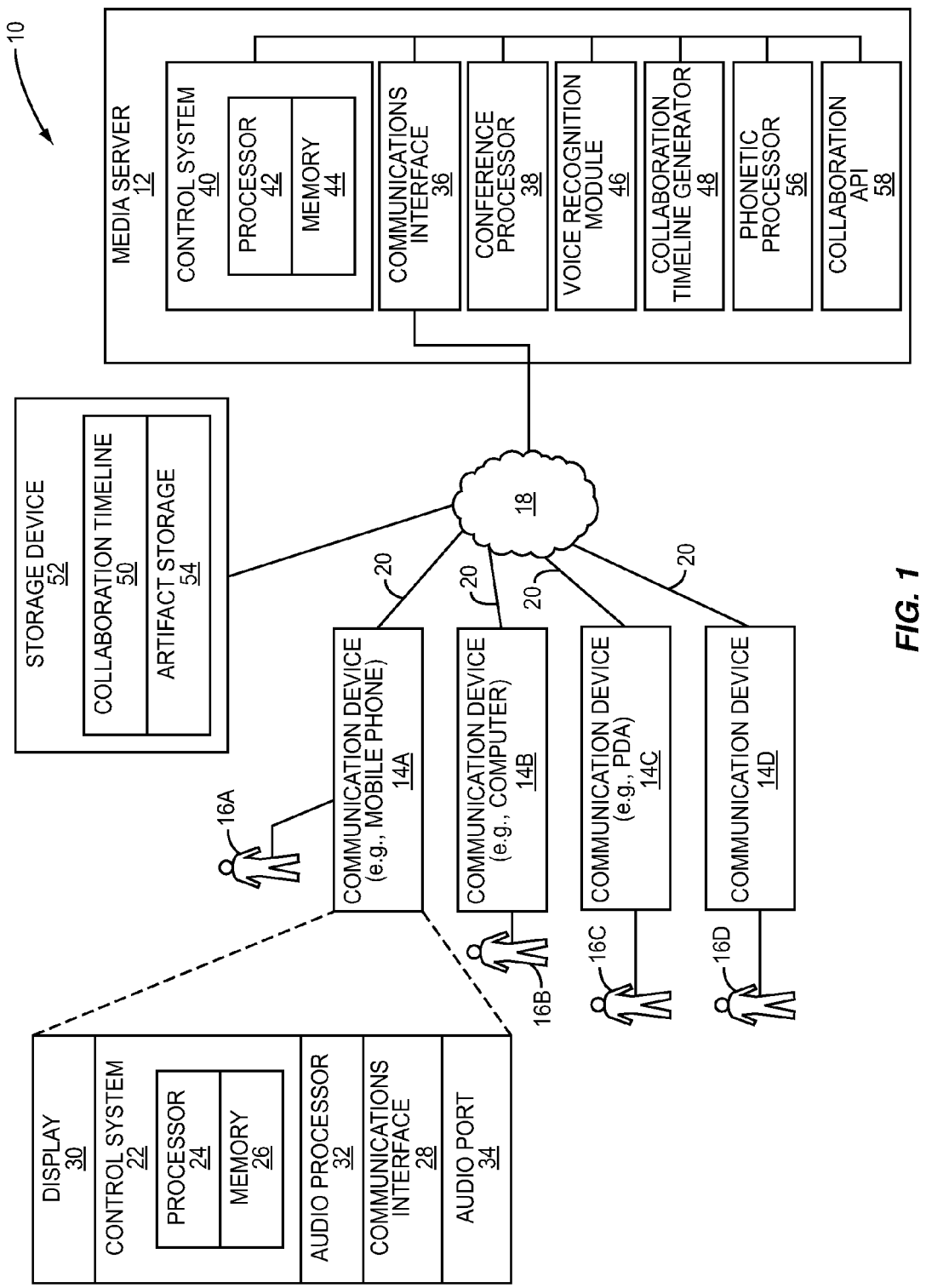
FIG. 1 is a block diagram illustrating a system in which embodiments disclosed herein may be practiced.

FIG. 1 is a block diagram illustrating a system 10 in which embodiments disclosed herein may be practiced. The system 10 includes a plurality of processing devices, such as a media server 12 and a plurality of communication devices 14A-14D (generally, communication device 14 or communication devices 14). The communication devices 14A-14D are used by corresponding participants 16A-16D (generally, participant 16 or participants 16) in a collaboration session. As discussed above, a collaboration session is a session in which real-time information is exchanged between participants without the need for separate and repeated message initiation triggering by a user. The information exchanged may be audio information, video information, or a combination of both. For purposes of illustration, the embodiments described herein will be discussed in the context of a collaboration session in which audio information is exchanged; however, the embodiments are not limited to the exchange of audio information.

In one embodiment, the communication device 14 is a device capable of sending and receiving voice signals, and is capable of executing a collaboration application as further described below. The communication device 14 may comprise, for example, a computer; a personal digital assistant (PDA); a mobile phone, such as an Apple® iPhone®; or the like.

While for purposes of illustration embodiments are described herein in the context of a single communication device 14 that is capable of both audio processing and collaboration application functionality, the embodiments are not limited to the use of a single processing device. One or more of the participants may participate in the collaboration session with multiple processing devices, one of which (e.g., a telephone) handles and otherwise processes the audio aspects of the collaboration session, and another of which (e.g., a computer) handles the collaboration application aspects of the collaboration session. In particular, a participant may use a conventional telephone to dial into a particular conference bridge, and may also direct a program on a computer, such as a web browser program, to a particular location, such as a particular website, in order to communicatively couple the computer to the collaboration session. Of course, the communication device 14 may also comprise a single processing device, such as a computer with a microphone and headset, or a smartphone, such that both the audio aspects and the collaboration application aspects of the embodiments described herein are handled by a single processing device.

The communication devices 14 are communicatively coupled to the media server 12 and to one another via one or more networks 18. While only a single network 18 is illustrated in FIG. 1, it will be appreciated that communications may travel over multiple networks, such as a private local area network (LAN) in a participant's house, a public access network, an enterprise network, and so on, between the processing devices. The communication devices 14A-14D may connect to the network 18 via any suitable network access paths 20, such as, for example, telephony technology, digital subscriber line technology, cable modem technology, cellular technology, Wi-Fi®, Bluetooth®, or the like. Data, such as control signals, audio signals, and the like, are typically carried over a network access path 20.

An exemplary communication device 14, such as the communication device 14A, includes a control system 22, which may include a processor 24 and a random access memory (RAM) 26, for controlling the overall operation of the communication device 14A, and for executing collaboration applications as discussed in greater detail herein.

The communication device 14A may also include a communications interface 28 that is adapted to communicate with the network 18 to facilitate communications between the communication device 14A and external devices, such as the media server 12. The communication device 14A also includes, or is coupled to, a display 30 upon which video artifacts of collaboration applications may be rendered, and via which, with the aid of an input device such as a mouse or keyboard, it is possible to interact with collaboration applications. The communication device 14A also preferably includes a media processor, such as an audio processor 32, which generates a media stream that includes voice signals of the participant 16A and sends the media stream to the media server 12 continuously during the collaboration session, or continuously for as long as the communication device 14A detects that the participant 16A is speaking. The media stream is typically, although not necessarily, a digitized data stream that is generated by the audio processor 32 and represents the voice signals of the participant 16A. Over the course of a conference, the media stream of any particular participant 16 may be discontinuous, in that the media stream may be generated only when the participant 16 is actually speaking. As used herein, the phrase incoming media stream will refer to a media stream that is sent from a communication device 14 to the media server 12, and the phrase outgoing media stream will refer to a media stream that is sent from the media server 12 to a communication device 14.

For purposes of illustration only, the embodiments herein will be discussed in the context of a telephone conference, and the media stream is thus an audio stream. However, the embodiments herein are not limited to media streams that contain only audio streams, and are equally applicable to media streams that include video only, and to media streams that include both video and audio.

The audio processor 32 receives outgoing media streams from the media server 12 and provides the outgoing media streams to an audio port 34 to which an audio device, such as a headset or speakers, may be coupled. Alternatively, if the communication device 14A is a smartphone, for example, the audio device would be integral with the communication device 14A.

Each of the communication devices 14 establishes a communication session with the media server 12. A communication session may comprise any type of session or connection between a respective communication device 14 and the media server 12 that enables the transmission of a media stream from the respective communication device 14 to the media server 12, and the receipt of a media stream from the media server 12 to the respective communication device 14, irrespective of the underlying physical infrastructure used to carry the media stream, or the particular protocol used to establish the communication session between the respective communication device 14 and the media server 12. Suitable protocols may include, for example, TCP/IP, Session Initiation Protocol (SIP), conventional public switched telephone network (PSTN) signaling, or the like. A network access path 20, such as a wired or wireless access path, typically couples a communication device 14 to the network 18.

The media server 12 includes a communications interface 36 that is adapted to communicate with the communication network 18, and can comprise any suitable combination of hardware and/or software necessary to receive incoming media streams from the communication devices 14, and to send outgoing media streams to the communication devices 14.

The media server 12 also includes a conference processor 38 that may establish a conference between the participants 16. The conference processor 38 includes a mixer that enables the conference processor 38 to mix or combine multiple media streams and provide a mixed outgoing media stream to one or more communication devices 14. During a collaboration session, the conference processor 38 operates to generate a collaboration media stream that comprises the media streams of the participants 16 during a particular period of time during the collaboration session. The collaboration media stream includes a media stream time index which can be used to directly access a location of the collaboration media stream based on time. The collaboration media stream may comprise a mixed audio stream that includes the audio signals of all the participants during the collaboration session if the media stream is an audio stream. The collaboration media stream may comprise a plurality of video streams of all the participants if the media stream is a video stream. The collaboration media stream may comprise a combination of a combined audio stream and a plurality of video streams where the media streams include both audio and video, for example.

The media server 12 also includes a control system 40, which may include a processor 42 and a memory 44, for controlling the overall operation of the media server 12. A voice recognition module 46 may enable one or more of the participants 16 to issue commands during a collaboration session, such as a command issued by one of the participants 16 indicating that an artifact generated by a collaboration application should be stored in a collaboration timeline. A collaboration timeline generator 48 represents functionality in the media server 12 that generates a collaboration timeline 50 which corresponds to a particular collaboration session. The collaboration timeline 50 will be discussed in greater detail herein. The collaboration timeline 50 may be stored on a storage device that is local to or integral with the media server 12, or on a network-attached storage device 52, for example. The storage device 52 may also store one or more artifacts in an artifact storage 54.

Embodiments described herein may be implemented in hardware, software, or a combination thereof. When implemented in software, the software comprises software instructions which may be executed on a processor, such as the processor 42, to cause the processing device, such as the media server 12, to implement the functionality described herein. Thus, embodiments may be implemented as a computer program product, such as a computer-usable or computer-readable medium having a computer-readable program code embodied therein. The computer-readable program code can include the software instructions for implementing the functionality of the embodiments described herein.

A phonetic processor 56 may be used to generate a phonetic index that corresponds to the collaboration media stream where the media stream includes audio signals. A phonetic index enables a participant 16 or other entity to subsequently search the collaboration media stream for the occurrence of words or phrases that may have been spoken during the collaboration session. The phonetic index can therefore be used to rapidly locate a location in the collaboration media stream where a desired topic was discussed during the collaboration session. Phonetic indexes may be generated using phonetic indexing technology, which is available from, for example, Nexidia Inc., 3565 Piedmont Road NE, Building Two, Suite 400, Atlanta, Ga. 30305. Additional details relating to the generation of a particular phonetic index are detailed in U.S. Patent Application Publication No. 2010/0094630 A1, which is hereby incorporated herein by reference in its entirety.

In one embodiment, the media server 12 offers a collaboration application programming interface (API) 58 which enables a collaboration application to communicate with the media server 12. For example, a collaboration application may invoke the collaboration API 58 to automatically notify the media server 12 that an artifact has been generated during a collaboration session. The collaboration application may also provide the generated artifact, or a reference to the generated artifact, to the media server 12 via the collaboration API 58.

Figure 2:
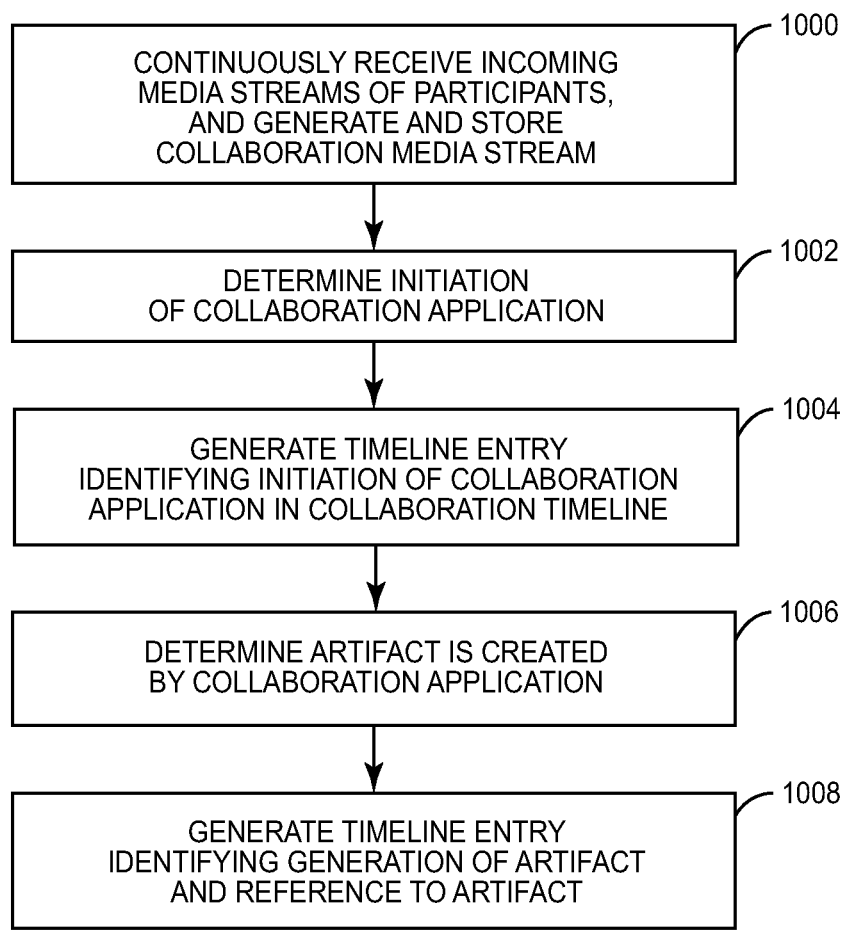
FIG. 2 is a flowchart for generating a timeline entry in a collaboration timeline according to one embodiment.

FIG. 2 is a flowchart for generating a timeline entry in a collaboration timeline according to one embodiment. FIG. 2 will be discussed in conjunction with FIG. 1. Assume that the participants 16A-16D arrange a time to conduct a collaboration session to discuss a business matter. At the designated time, communication sessions are initiated between the communication devices 14A-14D and the media server 12 via the conference processor 38. Such communication sessions could be initiated in any desired manner, such as by manually entering a particular phone number associated with the media server 12, automatically via a communications application resident on each of the communication devices 14, or via other suitable mechanisms. During the collaboration session, as the participants 16 speak, incoming media streams are generated by the respective communication device 14 and provided to the media server 12. The conference processor 38 generates outgoing media streams and provides the outgoing media streams to the other participants 16 via corresponding communication devices 14.

Additionally, as the media server 12 continuously receives the incoming media streams of the participants 16 during the collaboration, the media server 12 generates a collaboration media stream that includes the voice signals of the participant(s) 16 speaking during the collaboration (step 1000). The collaboration media stream includes a media stream time index which can be used to directly access a location of the collaboration media stream based on time. The collaboration media stream is typically stored in a file on a storage, such as the storage device 52, and may be encoded in any suitable public or proprietary format, such as WAV, MPEG, or the like. If the collaboration media stream comprises video information, the collaboration media stream may be stored in a suitable video format, such as MPEG or the like.

At some point during the collaboration session, one of the participants 16 initiates a collaboration application. As discussed above, the term collaboration application refers to an application that can receive input from a plurality of the participants in the collaboration session, and based on such input, render an artifact to at least one of such participants. Preferably, the collaboration application can receive input from all the participants in the collaboration session, and can render an artifact to each of the participants. A collaboration application may be implemented via a client server architecture, where a separate client thread may execute on each of the communication devices 14, and a master thread may execute on a central server, such as the media server 12. A collaboration application may also be implemented via a peer-to-peer architecture, where a separate thread executes on each of the communication devices 14 and exchanges information with the other threads without the aid of a master thread. A collaboration application may also be a web-based application implemented through a browser application executing on the communication devices 14.

In some collaboration applications, input at one communication device 14 may practically instantaneously be reflected on the other communication devices 14. An example of a collaboration application is a spreadsheet application which, when initiated, includes application processes, or threads, that execute on each of the communication devices 14A-14D. A new spreadsheet may be opened by, for example, the participant 16A, and the new (blank) spreadsheet may be automatically displayed on each of the communication devices 14A-14D.

In one embodiment, the collaboration application is capable of interfacing with the media server 12 via, for example, the collaboration API. Thus, the media server 12 may determine that the collaboration application has initiated by virtue of the collaboration application invoking a particular function of the collaboration API 58 (step 1002). In response, the media server 12 may generate a timeline entry in the collaboration timeline 50 that identifies this event by, for example, the name of the collaboration application and the time of initiation of the collaboration application (step 1004).

Assume that the participant 16B enters several numbers that identify the costs of various components of a product into the spreadsheet. The participant 16B then enters a spreadsheet formula that applies an algorithm to the numbers to determine a sum of the numbers. As the participant 16B manipulates the spreadsheet, the spreadsheets displayed on the communication devices 14A, 14C, and 14D may be substantially concurrently updated with the same information, allowing the participants 16A, 16C, and 16D to view the same information as the participant 16B. In essence, each of the participants 16A-16D view the same spreadsheet simultaneously. The output of the spreadsheet application in this example is an example of an artifact. In this example, the artifact is the image that is displayed to the participants 16 and which reflects the newly entered cost numbers and the sum of the cost numbers.

The media server 12 determines that the artifact has been generated by the spreadsheet collaboration application (step 1006). The media server 12 may make this determination in any of a number of different ways. In one embodiment, the collaboration application may invoke the collaboration API 58 when an artifact is generated by the collaboration application. In another embodiment, one of the participants 16 may select a "Store Artifact" control that is displayed by the collaboration application. In either embodiment, the media server may be provided with information regarding the artifact, such as the time of the generation of the artifact; a copy of the artifact; or a reference, such as a URL, to the artifact; and other desired information. In response, the media server 12 generates a timeline entry in the collaboration timeline 50 that includes the time information associated with the generation of the artifact, and a reference to the artifact (step 1008). The reference to the artifact may include a copy of the artifact, or a link, such as a URL, to the artifact. For example, the collaboration application may store artifacts in an artifact storage 54, and provide to the media server 12 a URL identifying the location in the artifact storage 54 of the particular artifact. The artifact typically is not separately saved in the collaboration media stream. For example, where the collaboration media stream includes audio signals, and the artifact comprises an audio artifact, the audio artifact would not typically be stored in the collaboration media stream.

In another embodiment, a participant may be able to enter a voice command, such as by speaking the phrase "store artifact," which may be recognized during the collaboration session by the voice recognition module 46 as a command to generate the timeline entry in the collaboration timeline 50. In such embodiment, upon recognition of the command, the media server 12 may communicate with the collaboration application, requesting suitable information, such as the artifact, time of generation of the artifact, and the like.

This process may be repeated during the collaboration session, resulting in a number of timeline entries in the collaboration timeline 50 that identify artifacts generated by one or more collaboration applications during the collaboration session.

Figure 3:
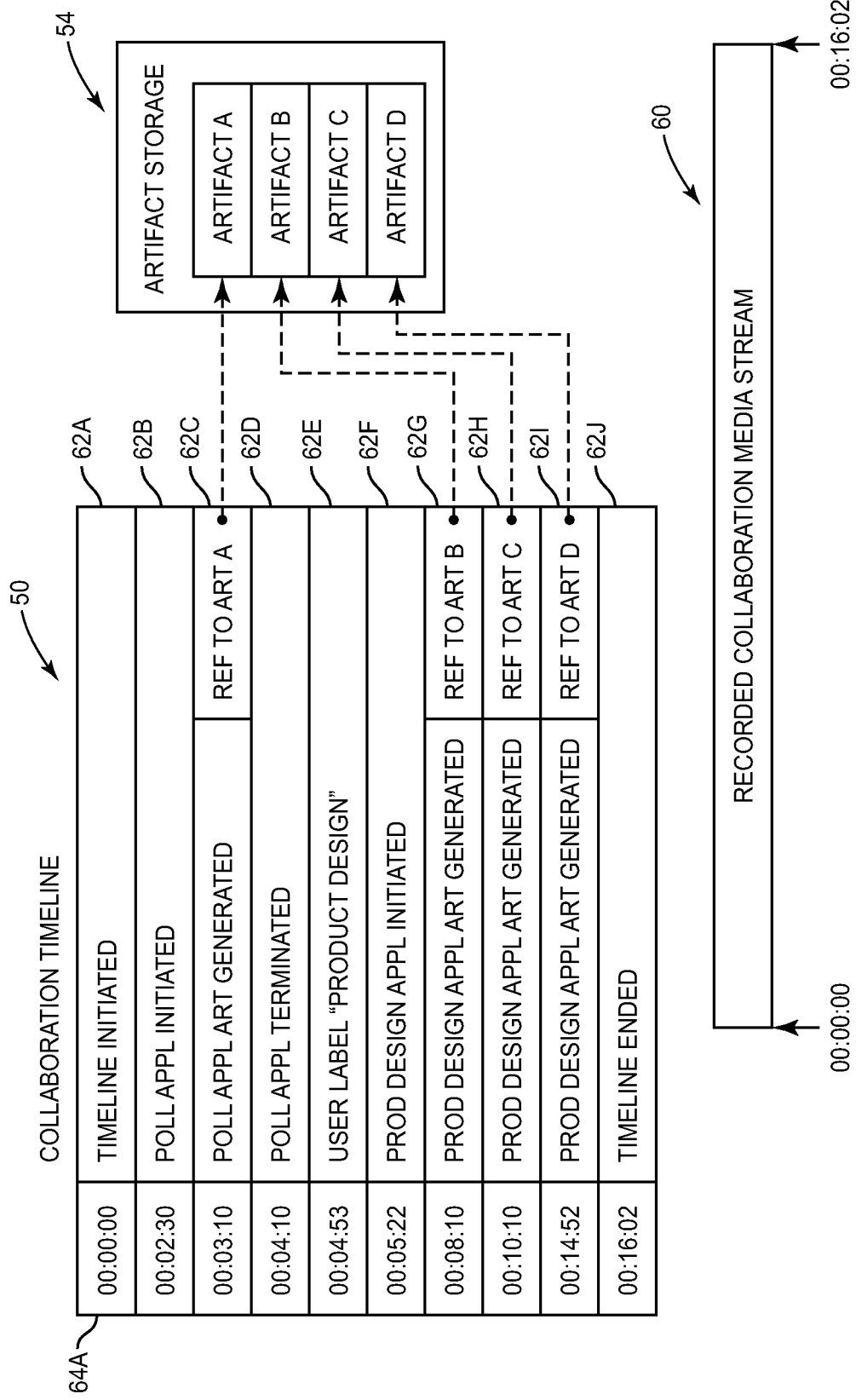
FIG. 3 is a block diagram of a collaboration timeline according to one embodiment.

FIG. 3 is a block diagram of a collaboration timeline 50 according to one embodiment. While for purposes of illustration the collaboration timeline 50 is illustrated as a separate structure from a corresponding collaboration media stream 60, it should be apparent that the collaboration media stream 60 may be either integral with or separate from the collaboration timeline 50 to which the collaboration media stream 60 corresponds. If separate, the collaboration timeline 50 preferably includes information that identifies the corresponding collaboration media stream 60, such as a location of the collaboration media stream 60, or some other reference that enables subsequent access to the collaboration media stream 60 in conjunction with access to the collaboration timeline 50. Similarly, while artifacts will be discussed as being stored in the artifact storage 54, in other embodiments the artifacts may be integral with the collaboration timeline 50.

The collaboration timeline 50 includes a plurality of timeline entries 62A-62J, each of which identifies an event that occurred during a corresponding collaboration session. The collaboration timeline 50 in this example covers the complete duration of the corresponding collaboration session, although in other embodiments the collaboration timeline may be generated for only designated periods during the collaboration session. Moreover, the collaboration timeline 50 may be generated automatically by the media server 12 upon some event, such as the initiation of the collaboration session, or upon initiation of a collaboration application, or may be generated in response to a request by a participant 16 to begin generating the collaboration timeline 50.

For purposes of illustration, assume that the collaboration timeline 50 relates to a collaboration session that had a duration of 16 minutes and 2 seconds and involved the use of two different collaboration applications, a polling collaboration application and a product design collaboration application. The collaboration media stream 60 contains the voice signals of the participants 16 that were generated during the collaboration session, and a media stream time index which can be used to directly access a location of the collaboration media stream based on time.

The timeline entry 62A reflects the initiation of the collaboration session, and contains a time offset 64A (generally, time offset 64 or time offsets 64) (or an actual time of day) that identifies the time of initiation of the collaboration session. Although not illustrated, the timeline entry 62A could also include information such as the names of the participants 16 who participated in the collaboration session; a textual identifier identifying a purpose of the collaboration session; day, month and year information identifying when the collaboration session took place; and the like.

The timeline entry 62B indicates that the collaboration polling application ("POLL APPL" in FIG. 3) was initiated at 2 minutes and 30 seconds into the collaboration session. As discussed above, the media server 12 may have generated the timeline entry 62B in response to being notified by the polling application that the polling application had been initiated. The timeline entry 62C indicates that the polling application generated an artifact A ("ART" in FIG. 3) at 3 minutes and 10 seconds into the collaboration session. Also, the timeline entry 62C includes a reference to the artifact A in the artifact storage 54. The timeline entry 62D indicates that the polling application terminated 4 minutes and 10 seconds into the collaboration session. The timeline entry 62E indicates that at 4 minutes and 53 seconds into the collaboration session, a user label was stored in the collaboration timeline 50. A user label may be generated by a participant 16 at any desired time and comprise any desired identifying indicia, such as a particular textual identifier. Such user labels may be used in conjunction with a timeline player, as discussed below, to quickly allow the user of the timeline player to navigate the timeline player to a desired location in the collaboration timeline 50. The timeline entry 62E may be generated, for example, by a user who knows that the participants 16 are about to discuss a particular topic, such as product design. In order to cause the media server 12 to generate the timeline entry 62E, the participant 16 may select a control provided by the collaboration application, or may issue a verbal command recognized by the voice recognition module 46 as a command to generate the timeline entry 62E.

The timeline entry 62F indicates that the collaboration product design application ("PROD DESIGN APPL" in FIG. 3) was initiated 5 minutes and 22 seconds into the collaboration session. The timeline entry 62G indicates that the product design application generated an artifact B 8 minutes and 10 seconds into the collaboration. The artifact B may comprise, for example, a diagram of a potential new product that is being designed by the participants 16 during the collaboration session. The timeline entry 62G includes a reference to the artifact B in the artifact storage 54. The timeline entry 62H indicates that the product design application generated an artifact C 10 minutes and 10 seconds into the collaboration. The timeline entry 62I indicates that the product design application generated an artifact D 14 minutes and 52 seconds into the collaboration. The timeline entry 62J indicates that the collaboration session ended after a duration of 16 minutes and 2 seconds.

Because the collaboration timeline 50 includes time offsets, such as the time offset 64A, which corresponds to times during the collaboration session that the timeline entries 62 were generated, the timeline entries 62 can be correlated to locations in the collaboration media stream 60 that contain audio of the participants 16 at the time of the generation of the corresponding timeline entry 62.

Figure 4:
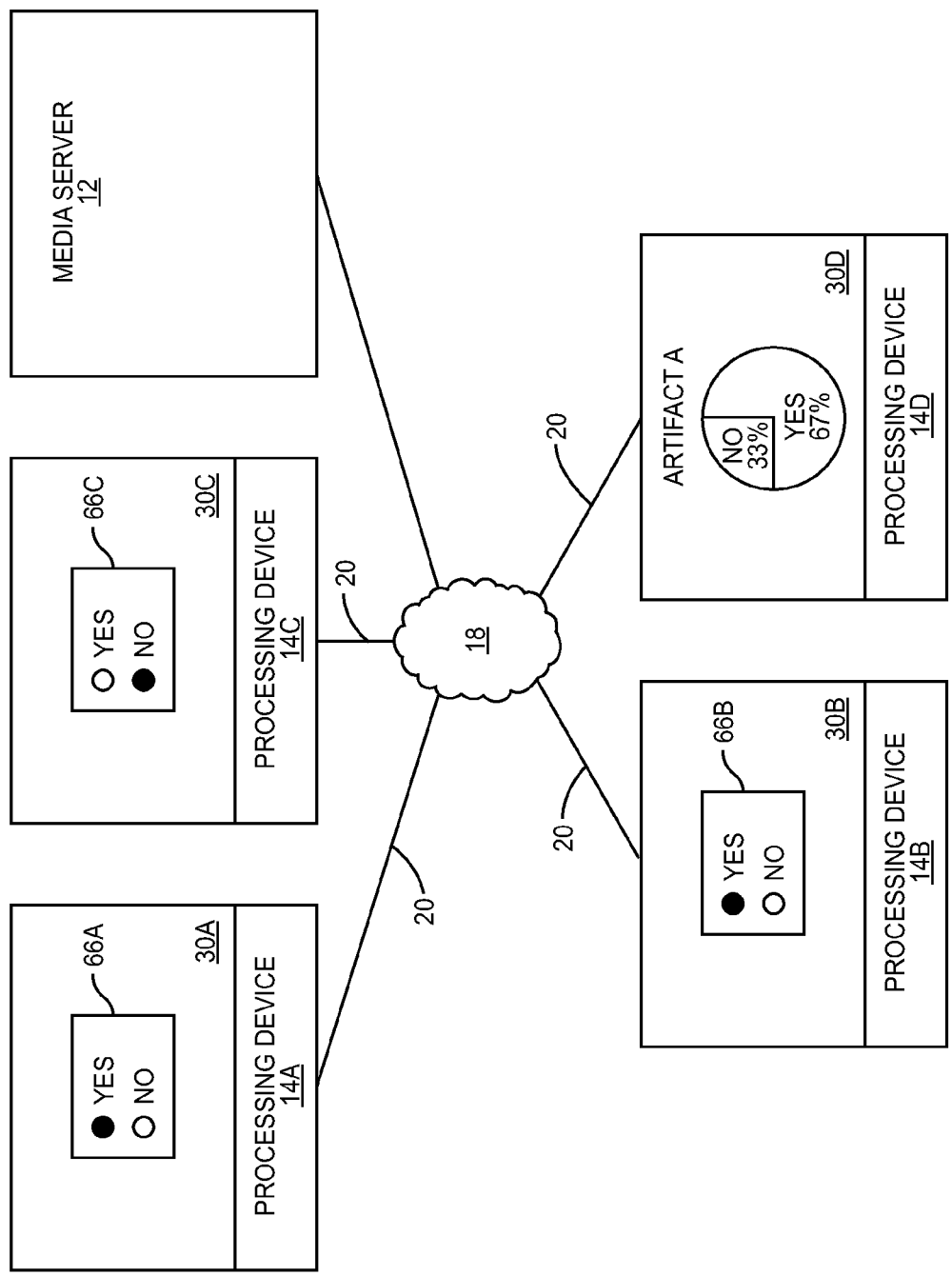
FIG. 4 is a block diagram of a system in which artifacts are generated, according to one embodiment.

FIG. 4 is an exemplary block diagram illustrating the generation of the artifact A illustrated in FIG. 3. Assume that the collaboration polling application is a collaboration application that, among other features, enables a participant 16 to poll other participants 16 during a collaboration session. The poll may relate to a discussion being conducted during the collaboration session. For example, assume that the participant 16D asks the participants 16A-16C whether or not they feel a new policy should be implemented at the company that employs participants 16A-16D. The participant 16D executes a collaboration polling application, selects the appropriate features to cause polling option boxes 66A-66C to be displayed on the displays 30A-30C of the communication devices 14A-14C, and verbally asks the participants 16A-16C to indicate whether or not the new policy should be implemented. As illustrated in FIG. 4, assume that the participant 16A selects "yes," the participant 16B selects "yes," and the participant 16C selects "no." The polling application generates the artifact A which comprises a graph of the results and displays the artifact A on the display 30D of the participant 16D. The artifact A may or may not also be displayed on the displays 30A-30C. The polling application automatically stores the artifact A in the artifact storage 54, and calls the collaboration API 58 of the media server 12 and provides a reference to the artifact A. The media server 12, in turn, generates the timeline entry 62C in the collaboration timeline 50 (FIG. 3).

Figure 5:
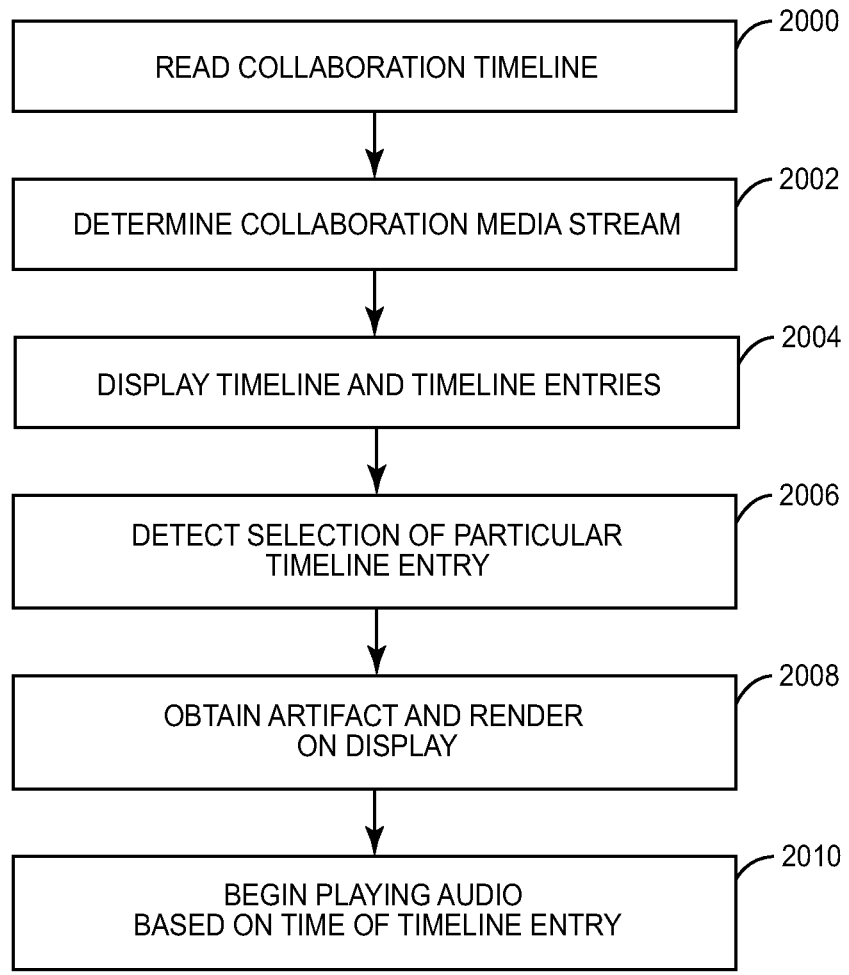
FIG. 5 is a flowchart of an exemplary process of a timeline player according to one embodiment.

In one embodiment, a timeline player is capable of accessing the collaboration timeline 50, the collaboration media stream 60, and the artifact storage 54, enabling efficient access to the artifacts generated during a collaboration session, along with the audio streams (if the information exchange included audio) of the participants 16 that were generated before, during, and after the generation of the artifact. Assume, for example, that one of the participants 16, after the termination of the collaboration session discussed with regard to FIG. 4, subsequently desires to re-familiarize himself with the discussions surrounding a particular artifact generated during the collaboration session. For example, two months after the policy discussed with respect to FIG. 4 was implemented at the company, the participant 16D cannot recall why the participants 16A-16D thought the policy was a good idea. The participant 16D initiates a timeline player application on the communication device 14D. FIG. 5 is a flowchart of an exemplary process of the timeline player. The participant 16D may first identify to the timeline player the particular collaboration timeline 50 that the participant 16D wishes to view. For example, the timeline player may display a folder of all collaboration timelines 50 arranged chronologically, and enable the participant 16D to select the desired collaboration timeline 50.

Figure 6:
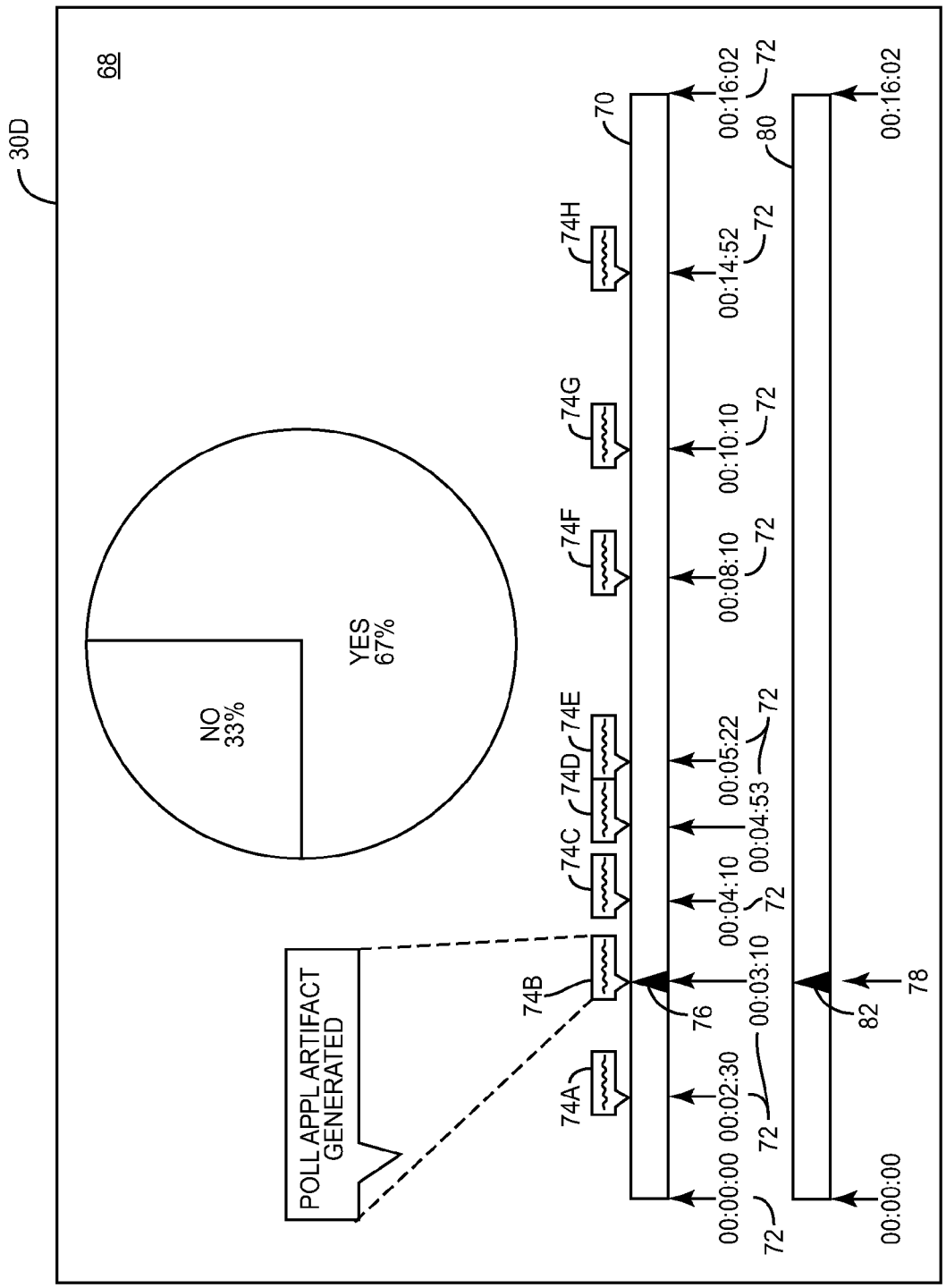
FIG. 6 is a diagram of an exemplary user interface that may be displayed by the timeline player on a playback device.

The timeline player reads the collaboration timeline 50 from the storage device 52 (step 2000). If the collaboration media stream 60 is not integral with the collaboration timeline 50, the timeline player may then determine based on information in the collaboration timeline 50 the appropriate collaboration media stream 60 (step 2002). The timeline player may then identify the timeline entries 62 (FIG. 3) in the collaboration timeline 50 and display information regarding the timeline entries on the display 30D of the communication device 14D (step 2004). FIG. 6 is a diagram of an exemplary user interface 68 that may be displayed by the timeline player on the display 30D. The user interface 68 includes a timeline slider 70 that includes time offset identifiers 72 that identify particularly relevant times during the corresponding collaboration session during which timeline entries 62 were generated. The user interface 68 may also include tags 74A-74H that include information identifying the timeline entries 62. For example, the tag 74B indicates that the polling application generated the artifact A at 3 minutes and 10 seconds into the collaboration session.

Assume that the participant 16D selects a selector arrow 76 and moves the selector arrow 76 to point at the tag 74B to select the timeline entry 62C (FIG. 3). The timeline player detects this selection of the timeline entry 62C (FIG. 5, step 2006), obtains the artifact A from the artifact storage 54, and renders the artifact A in the user interface 68 (step 2008). The timeline player also sets a begin location 78 with respect to an audio stream slider 80. The audio stream slider 80 corresponds to the collaboration media stream 60. The begin location 78 may coincide with the time of the creation of the timeline entry 62C (i.e., 3 minutes and 10 seconds), or may be set to a point in time prior to such time. Setting the begin location 78 to a point in time prior to the time of generation of the timeline entry 62 increases the likelihood that the begin location 78 will be positioned at a point in the collaboration media stream 60 that coincides with the discussion relating to the generation of the artifact A. In one embodiment, the begin location 78 may comprise a predetermined amount of time prior to the generation of a timeline entry 62, such as 2 minutes prior to the time of the generation of the timeline entry 62. Thus, in such embodiment, the begin location 78 may be set to 1 minute and 10 seconds into the collaboration audio stream. In another embodiment, the begin location 78 may be set to coincide with the timeline entry 62 that immediately precedes, in time, the selected timeline entry 62.

The timeline player then renders the audio stream from the collaboration media stream 60 concurrently with the display of the artifact A in the user interface 68. The participant 16B may slide a selector arrow 82 to a different point along the audio stream slider 80 to select a different point in the collaboration media stream 60. Upon detection of a change along the audio stream slider 80 of the location of the selector arrow 82, the timeline player begins to render the audio from the collaboration media stream 60 that corresponds to such location. While FIG. 6 illustrates that the timeline slider 70 is separate from the audio stream slider 80, in other embodiments a single slider could be used.

The timeline player enables a user to quickly and intuitively view the artifacts that were generated in a previous collaboration session, and also to listen to the discussion between the participants 16 in the collaboration session relating to the generation of the artifact. In embodiments wherein the collaboration media stream 60 comprises a video stream without audio, the timeline player may render the collaboration media stream 60 in a first window, and render artifacts concurrently in a second window. In embodiments wherein the collaboration media stream 60 comprises both an audio stream and a video stream, the timeline player may render the video portion of the collaboration media stream 60 in a first window, render artifacts in a second window, and render the audio track through an audio output device, such as a headset or speakers. Where the artifact is solely an audio artifact, the timeline player may render both the collaboration media stream 60 and the audio artifact through an audio output device.

Embodiments described herein may be implemented in hardware, software, or a combination thereof. When implemented in software, the software comprises software instructions which may be executed on a processor, such as the processor 42 (FIG. 1), to cause the processing device, such as the media server 12, to implement the functionality described herein. Thus, embodiments may be implemented as a computer program product, such as a computer-usable or computer-readable medium having a computer-readable program code embodied therein. The computer-readable program code can include the software instructions for implementing the functionality of the embodiments described herein.

Those skilled in the art will recognize improvements and modifications to the preferred embodiments of the present disclosure. All such improvements and modifications are considered within the scope of the concepts disclosed herein and the claims that follow.

What is claimed is:

1. In a collaboration session comprising a plurality of collaboration participants, a method for generating a collaboration media stream and a collaboration timeline of the collaboration session, the method comprising:

receiving media streams associated with a plurality of collaboration participants during a collaboration session, each collaboration participant collaborating via a corresponding processing device of a plurality of processing devices that are communicatively coupled to one another, the collaboration session comprising a real-time information exchange between the plurality of collaboration participants during the collaboration session;

forming a collaboration media stream based on the media streams, the collaboration media stream including a media stream time index;

determining that a collaboration application has generated an artifact during the collaboration session, the collaboration application adapted to receive input from at least two of the plurality of collaboration participants; and generating a timeline entry in a collaboration timeline, the timeline entry comprising time information identifying a time associated with the artifact, and a reference to the artifact;

wherein the timeline entry in the collaboration timeline is different than the media stream time index and the reference to the artifact is an external reference.

2. The method of claim 1, further comprising generating a plurality of timeline entries in the collaboration timeline, each of the plurality of timeline entries corresponding to one of a plurality of artifacts generated during the collaboration session.

3. The method of claim 1, wherein the timeline entry further comprises data identifying the collaboration application that generated the artifact.

4. The method of claim 1, further comprising receiving the artifact from the collaboration application.

5. The method of claim 1, wherein the reference to the artifact comprises a copy of the artifact as the artifact was rendered on one of the plurality of processing devices.

6. The method of claim 1, wherein the reference to the artifact comprises a pointer to a storage location which stores the artifact separately from the collaboration timeline.

7. The method of claim 1, wherein determining that the collaboration application has generated the artifact during the collaboration session further comprises receiving a notification from the collaboration application indicating that the collaboration application has generated the artifact.

8. The method of claim 1, wherein the artifact is one of an image and an audio segment.

9. A media server, comprising:
a communications interface adapted to communicate with a network; and
a control system comprising a processor and coupled to the communications interface, the control system adapted to:
receive a plurality of media streams, each of the plurality of media streams corresponding to a different one of a plurality of processing devices that is involved in a collaboration session, the collaboration session comprises a real-time information exchange between a plurality of collaboration participants during the collaboration session;
store a collaboration media stream based on the plurality of media streams, the collaboration media stream including a media stream time index;
determine that a collaboration application has been initiated during the collaboration session, the collaboration application adapted to receive input from at least two of the plurality of collaboration participants;
determine that the collaboration application has generated an artifact during the collaboration session; and
generate a timeline entry in a collaboration timeline, the timeline entry comprising time information identifying a time associated with the artifact, and a reference to the artifact;
wherein the timeline entry in the collaboration timeline is different than the media stream time index and the reference to the artifact is an external reference.

10. The media server of claim 9, wherein the control system is further adapted to generate a plurality of timeline entries in the collaboration timeline, each of the plurality of timeline entries corresponding to one of a plurality of artifacts generated during the collaboration session.

11. The media server of claim 9, wherein the timeline entry further comprises data identifying the collaboration application that generated the artifact.

12. The media server of claim 9, wherein the control system is adapted to receive the artifact from the collaboration application.

13. A method for providing information from a collaboration timeline, the method comprising:
accessing a collaboration timeline, the collaboration timeline comprising a plurality of timeline entries, each of the plurality of timeline entries comprising time information identifying a time associated with an artifact generated by a collaboration application during a collaboration session, and a reference to the artifact, the collaboration session comprises a real-time information exchange between a plurality of collaboration participants during the collaboration session;
accessing a collaboration media stream that corresponds to the collaboration timeline, the collaboration media stream formed from a plurality of media streams of the collaboration session, the collaboration media stream including a media stream time index;
receiving a user selection of a particular timeline entry of the plurality of timeline entries;
obtaining an artifact associated with the particular timeline entry;
determining a begin location within the media stream time index of the collaboration media stream based on the particular timeline entry; and
displaying the artifact associated with the particular timeline entry on a display;
wherein the timeline entry in the collaboration timeline is different than the media stream time index and the reference to the artifact is an external reference.

14. The method of claim 13, further comprising concurrently playing the collaboration media stream at the begin location while displaying the artifact associated with the particular timeline entry on the display.

15. The method of claim 13, further comprising determining that at least one of the plurality of timeline entries further comprises timeline entry indicia identifying the particular timeline entry and displaying the timeline entry indicia on the display.

16. The method of claim 13, wherein the begin location comprises a time of the media stream time index that corresponds with the time associated with the artifact.

17. The method of claim 13, wherein the begin location comprises a time of the media stream time index that corresponds to a predetermined period of time prior to the time associated with the artifact.

18. The method of claim 13, wherein the begin location comprises a time of the media stream time index that corresponds to a time associated with a timeline entry immediately preceding the particular timeline entry.

19. The method of claim 13, wherein the artifact is in the collaboration timeline.

20. The method of claim 1, further comprising generating a phonetic index of the collaboration media stream.

21. The method of claim 20, wherein the phonetic index comprises at least one phoneme of a plurality of spoken words in the collaboration media stream.

22. The method of claim 21, wherein the phonetic index enables at least one of the plurality of collaboration participants to locate a time in the collaboration media stream in which the at least one phoneme was spoken in the collaboration media stream.

23. The media server of claim 9, wherein the control system is further adapted to generate a phonetic index of the collaboration media stream.

24. The media server of claim 23, wherein the phonetic index comprises at least one phoneme of a plurality of spoken words in the collaboration media stream.

25. The media server of claim 24, wherein the control system is further adapted to use the phonetic index to locate a time in the collaboration media stream in which the at least one phoneme was spoken in the collaboration media stream.

26. The method of claim 13, further comprising accessing a phonetic index of the collaboration media stream.

27. The method of claim 26, wherein the phonetic index comprises at least one phoneme of a plurality of spoken words in the collaboration media stream.

28. The method of claim 27, wherein the phonetic index provides access to a time in the collaboration media stream in which the at least one phoneme was spoken in the collaboration media stream.

* * * * *